United States Patent Office 3,459,564
Patented Aug. 5, 1969

3,459,564
HIGH DENSITY ALUMINA AND METHOD FOR PRODUCING IT
Irwin M. Lachman, Corning, N.Y., assignor to Corning Glass Works, Corning, N.Y., a corporation of New York
No Drawing. Continuation-in-part of application Ser. No. 506,121, Nov. 2, 1965. This application Feb. 14, 1967, Ser. No. 615,896
Int. Cl. C04b 35/10
U.S. Cl. 106—39      6 Claims

ABSTRACT OF THE DISCLOSURE

High density sintered high purity alumina having regular grain growth and improved translucency containing 0.01 to 0.4% by weight of cobalt calculated as cobalt oxide. The alumina is 99.9+% pure and substantially free from a significant amount of siliceous material. Cobalt compound, convertible to cobalt oxide on sintering, mixed with high purity compound. Temporary vehicle may be used in mixing. Composition may be pre-fired at low temperature and then sintered at 1500°–1900° C. Compression glaze applied to surface significantly improves strength of article.

CROSS-REFERENCE TO RELATED APPLICATION

This application is a continuation-in-part of U.S. application Ser. No. 506,121, filed Nov. 2, 1965, by Irwin M. Lachman, for High Density Alumina and Method for Producing It, now abandoned.

BACKGROUND OF THE INVENTION

Field of the invention

The present invention relates to an improved high density sintered high purity alumina product and to a process for producing it. More particularly, the invention is directed to the production of high purity alumina bodies having a density which is indistinguishable from theoretical density by ordinary methods of measurement.

The products of the invention are characterized by high density, high strength, thermal stability at elevated temperatures, regular grain growth and improved translucency. The materials are useful in the manufacture of high temperature lamp envelopes.

Description of the prior art

The prior art discloses the production of sintered alumina articles containing additions of metal oxides to improve certain properties. Illustrative of the prior art is U.S. Patent 1,827,838, Curtis, which proposes recrystallizing corundum in the presence of cobaltic oxide to provide a mass of interlocked corundum crystals. However, as noted in the patent, microscopic examination shows that the product consists of "elongated tabular corundum crystals closely packed together in an interlocked mass and welded at the peripheries by a glass, which is evident on account of the presence of silicates in practically all aluminum oxide ore with virtually all the cobalt added by the process . . . entering into the composition of the glass rather than the corundum crystals." A photomicrograph of the crystal structure of the Curtis type of alumina ceramic is shown in the photomicrograph in Kingery's "Introduction to Ceramics" (John Wiley 1960) at page 443. Such products are characterized by irregular or exaggerated grain growth and do not exhibit improved translucency.

Summary of the invention

According to the present invention, it has been found that improved alumina bodies may be produced by incorporating from 0.01 to 0.4 weight percent of cobalt ions calculated as cobalt oxide, CoO, in bodies of high purity alumina and firing at elevated temperatures in an oxygen containing atmosphere, such as air, or in a vacuum. Sintering the composition at a temperature in the range of from 1500° to 1900° C. yields improved high density alumina articles which are stable at high temperatures exhibit regular grain growth and have increased translucency. It has also been found that the strength of the products may be greatly enhanced by applying to their surfaces a compression glaze as more fully described hereinafter.

DESCRIPTION OF THE PREFERRED EMBODIMENTS

The preferred method for carrying out the invention comprises intimately mixing a cobalt compound with high purity alumina. The cobalt may be added in the form of any cobalt containing compound or composition which yields cobalt oxide upon being fired. The alumina starting material is of high purity. Alumina which has a purity of 99.9% or higher and is essentially free from any significant siliceous material is satisfactory. The starting materials are preferably provided in finely divided form and their admixture may be facilitated by the use of a liquid carrier which is non-reactive and which is driven off during a preliminary drying step or during firing. In the event that the cobalt compound is soluble in one or more liquid carriers, it may be convenient to use solutions of the compounds in such a liquid to obtain thorough mixing.

The ingredients are preferably mixed in a blender, the batch is dried and samples are dry-pressed into any desired shape, such as tubular envelopes, plates, bars or the like.

The dry-pressed material may then be subjected to a brief pre-firing operation at a relatively low temperature, i.e., low with respect to the final firing or sintering temperature. For example, the specimens may be pre-fired in air at a temperature of about 1330° C. for about one minute or less. The purpose of the pre-firing in an oxidizing atmosphere is to burn out residual carrier or binder material, to convert the metal compound to the oxide and to develop sufficient strength in the article to permit handling.

The final firing is carried out at a temperature in the range of from 1500° to 1900° C. The firing may be conducted in a vacuum or in an oxygen-containing atmosphere, preferably air. Vacuum fired specimens exhibit higher translucency.

The present invention will be more fully understood in light of the following detailed examples which represent certain preferred embodiments of the invention and the best mode that has been contemplated for carrying it out.

A series of batches were prepared by adding cobaltous carbonate, in the form of B and A reagent, to a high purity alumina (Alucer MCB) having a particle size of one micron and a purity of 99.97%. The cobaltous carbonate was mixed with acetone and added to the alumina in a blender. The mixture was then agitated until the ingredients were thoroughly mixed. The batch was removed from the blender and dried and was then dry-pressed into discs.

A number of specimens containing the cobalt additives were then fired in vacuum. The vacuum fired discs were preliminarily fired for up to about a minute or less at 1330° C. The results for various concentrations of additive and firing schedules are reported in Table I.

A number of specimens containing cobalt oxide and prepared as previously described were then fired in air. The results are reported in Table II.

of high purity alumina containing 0.05% by weight of cobalt oxide. Some of the air fired specimens were compression glazed and others were left unglazed as a control.

TABLE I.—VACUUM FIRED ALUMINA, WITH AND WITHOUT COBALT OXIDE ADDITIONS

| Specimen Composition | Firing Conditions | Results | | |
|---|---|---|---|---|
| | | Predominate Grain Size, microns | Color | Appearance |
| 0.05% CoO | 1,700° C., 1½ hrs. +1,750° C., ½ hr. vacuum. | *N.D. | Pink | Densified to high translucency. |
| 0.10% CoO | do | N.D. | do | Densified to high translucency 21.6% shrinkage. |
| 100% $Al_2O_3$ | do | N.D. | White | Slightly translucent. 8.35% shrinkage. |
| 0.05% CoO | 1,700° C., 2 hrs. plus 1,800° C., 1 hr. vacuum. | N.D. | Pink | Densified to high translucency. |
| 0.10% CoO | do | N.D. | do | Do. |
| 0.05% CoO | 1,700° C., 2 hrs. plus 1,750° C., 1 hr., vacuum. | 80 | do | Do. |
| 0.10% CoO | do | N.D. | do | Do. |

*Not determined.

TABLE II.—AIR FIRED ALUMINA, CoO ADDITIONS

| Specimen Composition | Firing Conditions | Results | | |
|---|---|---|---|---|
| | | Predominate Grain Size, microns | Color | Appearance |
| 0.05% CoO | 1,700° C., 2 hrs., air | *N.D. | Bluish tint | Translucent. |
| 0.10% CoO | do | 10 | do | Do. |

*Not determined.

Specimens prepared in accordance with the foregoing procedure and containing from 0.1 to 0.4 weight percent of cobalt ions calculated as cobalt oxide are characterized by improved translucency and regular crystalline structure. The microstructure of the products is an example of regular or normal grain growth of the type shown in the photomicrographs in Kingery's "Introduction to Ceramics," (John Wiley 1960) at pages 360 and 368.

Pure alumina specimens fired in the same manner as the specimens containing additive exhibit exaggerated grain growth and are only slightly translucent.

Specimens were prepared as described above, but using ferric nitrate and a 50% solution of manganous nitrate as additives in place of the cobalt compound. These ions were selected because their similar ionic size and valence suggested that they might have the same effect on the high purity alumina. As is apparent from the results of the tests reported in Table III, the iron and manganese ion additions result in alumina articles having exaggerated grain growth and poor translucency.

A glass of the following composition was used for the glaze:

$SiO_2$—66.0%, $Al_2O_5$—23.0% and CaO—11.0%.

The glass was melted, cooled, ground and dispersed in an organic vehicle to form a slurry. The doped alumina rods were then dipped into the slurry and fired at about 1500° C. for a half hour in air.

The glazed specimens exhibited significantly improved strength in modulus of rupture testing.

Thus, it will be seen that the present invention provides new sintered articles of high purity alumina having regular grain growth and high translucency, and methods for making them.

It will be obvious to those skilled in the art that the present invention may be modified in various respects without departing from the spirit and scope of the invention as expressed in the following claims.

What is claimed is:

1. A high density alumina article consisting essentially

TABLE III.—RESULTS OF VACUUM FIRED ALUMINA WITH FeO AND MnO ADDITIONS

| Specimen Composition | Firing Conditions | Results | | |
|---|---|---|---|---|
| | | Predominate Grain Size, microns | Color | Appearance |
| 0.05% FeO | 1,700° C., 2 hrs. plus 1,750° C., 1 hr., vacuum. | 400 | Grayish-white | Opaque. |
| 0.10% FeO | do | 400 | do | Do. |
| 0.10% FeO | do | 300–400 | do | Do. |
| 0.10% FeO | 1,600° C., 4 hrs., vacuum | *N.D. | do | Opaque, exaggerated grain growth. |
| 0.05% MnO | 1,700° C., 2 hrs., vacuum | >200 | Deep pink | Do. |
| 0.10% MnO | do | >200 | do | Do. |

*Not determined.

Reheating experiments, conducted with several cobalt doped specimens which were initially vacuum fired, indicate that the translucency and microstructure of the products is maintained despite reheating. The tests were conducted by heating the specimens at 1600° C. in air for three hours.

Air fired specimens in the form of dry-pressed bars about three inches long and a half inch wide and having a thickness of about 0.02 inch were then subjected to strength measurements in both the glazed and unglazed condition. The specimen composition tested was composed of vacuum sintered high purity alumina, said alumina, having a purity of about 99.9% and being substantially free from siliceous material, containing from 0.01 to 0.4% by weight of cobalt oxide and characterized by regular grain growth, improved translucency and density indistinguishable from theoretical density by ordinary means of measurement.

2. The article of claim 1 wherein at least a portion of the surface of said article is coated with a compression glaze.

3. A method for producing high density alumina bodies of improved translucency comprising mixing finely divided high purity alumina particles, said alumina having a purity of about 99.9% and being substantially free from siliceous material, with from 0.01 to 0.4% by weight of cobalt calculated as cobalt oxide, forming the mixture to a desired shape and vacuum sintering at a temperature in the range of from 1500 to 1900° C. until a self-supporting, sintered, high density article is obtained.

4. The method of claim 3 wherein said cobalt is mixed with said alumina by incorporating a compound of said cobalt in a thermally decomposable liquid vehicle, mixing the resulting liquid composition with said alumina, and firing to burn off said vehicle.

5. The method of claim 3 wherein said article is pre-fired in air before sintering.

6. The method of claim 3 further comprising coating the sintered article with compression glaze.

References Cited

UNITED STATES PATENTS

| | | | |
|---|---|---|---|
| 3,311,482 | 3/1967 | Klingler et al. | 106—65 |
| 2,152,656 | 4/1939 | McDougal et al. | 106—65 |

OTHER REFERENCES

Cahoon et al., Sintering and Grain Growth of Alpha-Alumina, J. Am. Cer. Soc., vol. 39, No. 10, 1956, pages 337–344, (Sci. Lib. T.P. 785 A. 62).

JAMES E. POER, Primary Examiner

U.S. Cl. X.R.

106—65